E. A. DEMMRICH.
TRIANGLE.
APPLICATION FILED NOV. 10, 1913.
1,187,272.
Patented June 13, 1916.
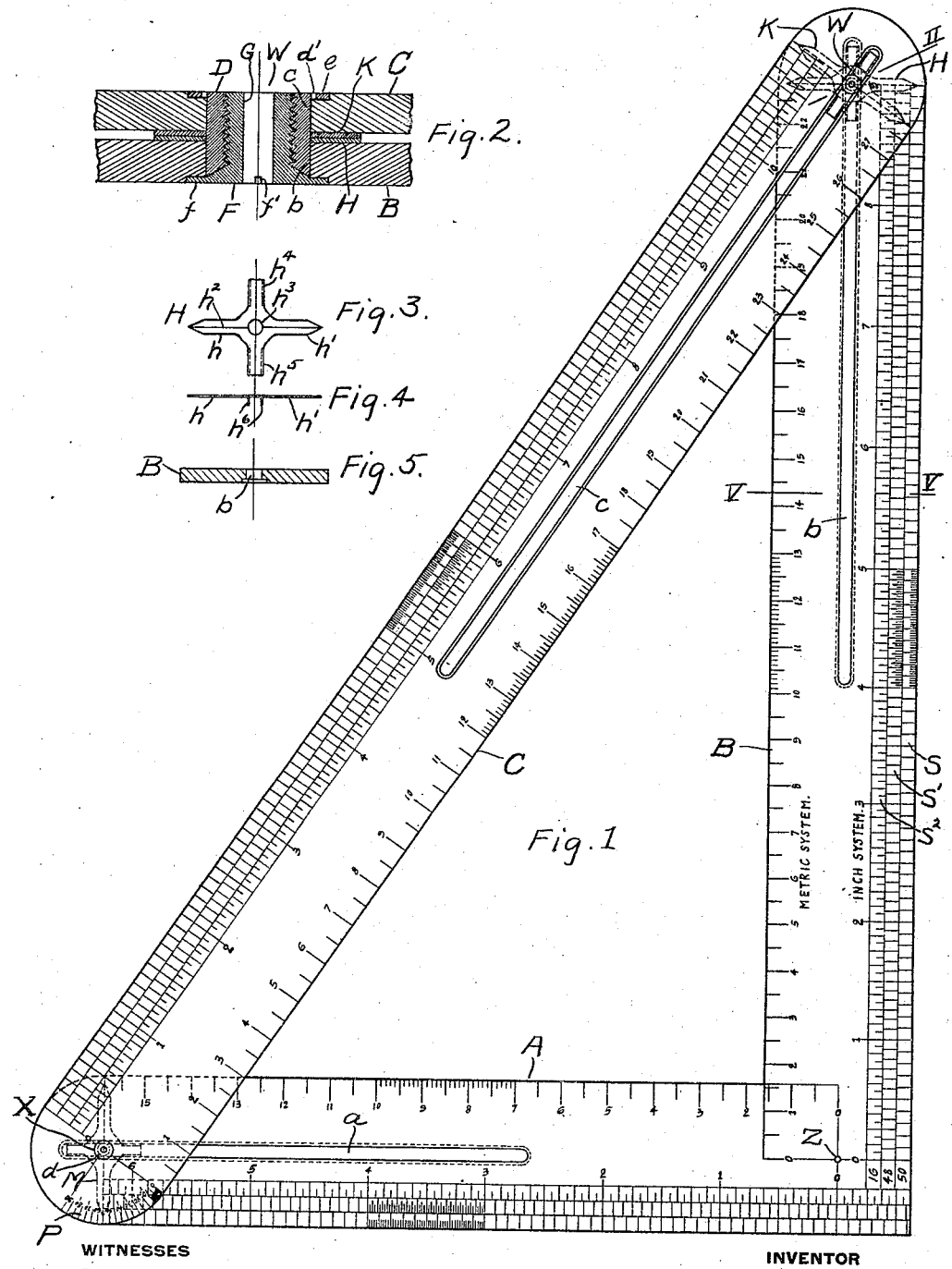
WITNESSES
G. Herman Wegner.
R. L. Kistler.
INVENTOR
Edwin A. Demmrich,
by A. L. Vencill
his Attorney.

UNITED STATES PATENT OFFICE.

EDWIN A. DEMMRICH, OF WILKINSBURG, PENNSYLVANIA.

TRIANGLE.

1,187,272.  Specification of Letters Patent.  Patented June 13, 1916.

Application filed November 10, 1913. Serial No. 800,036.

*To all whom it may concern:*

Be it known that I, EDWIN A. DEMMRICH, a subject of the Emperor of Germany, residing at Wilkinsburg, in the county of Allegheny and State of Pennsylvania, United States of America, have invented certain new and useful Improvements in Triangles, of which the following is a specification.

My invention relates to triangles.

One object of my invention is the provision of a triangle which may be employed for calculations.

Another object of my invention is the provision of an adjustable triangle for drafting purposes.

I will describe one form of triangle embodying my invention, and will then point out the novel features thereof in claims.

In the accompanying drawing, Figure 1 is a plan view showing one form of triangle embodying my invention. Fig. 2 is a sectional view on the line I I of Fig. 1, drawn on an enlarged scale. Fig. 3 is a plan view showing a pointer which forms part of the triangle shown in Fig. 1. Fig. 4 is a view showing in side elevation the pointer shown in Fig. 3. Fig. 5 is a sectional view on the line V—V of Fig. 1.

Similar reference characters refer to similar parts in each of the several views.

Referring to Fig. 1, the triangle comprises three legs A, B, and C. As here shown, the legs A and B are integral, hence they have a fixed angular relation, and the leg C is movable with relation to legs A and B; but I do not desire to limit myself to a triangle any two of whose legs have a fixed angular relation. As here shown, the angle between the legs A and B is 90°. The three legs are preferably formed of a suitable transparent material, such, for example, as celluloid. The leg C is slidably connected with the other two legs by any suitable means, which means as here shown is as follows: Legs A and B are provided respectively with slots $a$ and $b$, which slots are countersunk on the surfaces farthest from the observer as the triangle appears in Fig. 1. The cross-sectional form of these slots is shown in Fig. 5. Leg C is provided adjacent one end with a hole $d$, and extending from a point near the other end is a slot $c$; the hole $d$ and slot $c$ are both countersunk on the surface nearest to the observer as the triangle appears in Fig. 1. The cross-sectional form of both the hole $d$ and the slot $c$ is similar to that for slot $b$ as shown in Fig. 5, except that the countersink is reversed. The leg C is connected with leg B by a suitable stud W passing through slots $c$ and $b$ and having flanges $e$ and $f$ at opposite ends which lie in the countersunk portions of the slots. This stud is illustrated in section in Fig. 2, and as here shown is formed of two sections D and F, which are adapted to be screwed together. The outside diameter of section D is a shade less than the width of slots $b$ and $c$, so that the legs will swing about this section, and the inside bore of this section is threaded to receive screw threads which are provided on the outside surface of section F. The flange $e$ at one end of the stud is formed integral with section D, and the flange $f$ at the other end of the stud is formed integral with section F. Section F is provided with a slot $f'$ to receive a screwdriver, and section D is provided with two or more holes $d'$ to receive a spanner wrench, whereby the two sections may be readily screwed together. Section F is provided with a central bore G for a purpose hereinafter explained. Legs B and C are not in contact with each other, but are separated by two pointers H and K, which are described hereinafter. The two sections D and F of stud W are screwed together tightly enough to hold legs B and C and pointers H and K in contact with each other, but not so tightly but that each of these parts may slide freely on the adjacent part or parts and on the flanges of the stud. Preferably the degree of tightness to which the sections of the stud are screwed together is determined by the engagement of two shoulders on the respective sections as shown in Fig. 2. Leg C is connected with leg A by a stud X, which is similar to stud W and which passes through hole $d$ and slot $a$. Legs C and A are separated by one pointer M which is described hereinafter. It will be seen from the foregoing that the lower end of leg C is free to move along leg A within the limits imposed by slot $a$; and that when the stud X occupies any position in slot $a$, the leg C is free to assume any angle with relation to leg A within the limits imposed by slots $b$ and $c$.

Legs A, B and C are provided with scales of any desired kind and in any desired arrangement. As here shown, the inner edge of each leg is provided with a scale in the metric system, and the outer edge of each leg is provided with three scales S, S' and S² in the inch system. In scale S, each inch is divided into fiftieths, in scale S' each inch is divided into forty-eighths, and in scale S² each inch is divided into sixteenths. To avoid giving the drawing an unnecessarily cumbersome appearance, only one inch at about the middle of each leg is shown divided into the full number of parts, and only a few centimeters of the metric scale at about the middle of each leg are shown divided into millimeters.

The scales on leg A begin at a zero line which is in alinement with the center line of slot $b$ in leg B; and the scales on leg B begin at a zero line which is in alinement with the center line of slot $a$ in leg A. The scales on leg C begin at a zero line which passes through the center of stud X and which is perpendicular to slot $c$. Furthermore, the slots $a$ and $b$ are perpendicular to each other. Hence it will be seen that the center lines of the slots $a$, $b$, and $c$ form a right-angled triangle whose apices are the center of stud X, the center of stud W, and the intersection of the zero lines of the scales on legs A and B, at which latter point is a hole Z, the purpose of which will appear hereinafter. It will furthermore be seen that the lengths of the sides of this triangle are measured directly by the scales on the corresponding legs A, B and C. The pointers H, K and M are provided to facilitate reading the lengths of the sides of this right-angled triangle on the several scales. The construction of these pointers is shown in Figs. 3 and 4, from which it will be seen that each pointer comprises two arms $h$ and $h'$ which extend in diametrically opposite directions from the center of a hole $h^3$ and which terminate in points; these points are joined by a straight line $h^2$ which passes through the center of the hole $h^3$. The pointer is further provided with two other arms $h^4$ and $h^5$ which extend also in diametrically opposite directions from the center of hole $h^3$ but which are disposed at ninety degrees to arms $h$ and $h'$. The sides of these latter arms are bent as shown in Fig. 4 to form wings $h^6$ which are perpendicular to the plane of the arms $h$, $h'$, $h^4$ and $h^5$. The diameter of the hole $h^3$ is a shade larger than the outside diameter of the outer section D of stud W, hence the stud passes freely through this hole. The width of arms $h^4$ and $h^5$ is a shade less than the width of slots $a$, $b$ and $c$, hence the wings $h^6$ fit into these slots and are slidable therein. The pointers H, K and M are preferably of a transparent material such as celluloid. Pointer H rests against leg B and its wings $h^6$ extend downwardly into the slot $b$, so that the line $h^2$ on this pointer passes through the center of stud W and is always perpendicular to slot $a$; hence the line $h^2$ always indicates on any of the scales on leg B the distance between zero point Z and the center of stud W. Pointer K rests against leg C and its wings $h^6$ extend upwardly into slot $c$, so that the line $h^2$ on this pointer passes through the center of stud W and is always perpendicular to slot $c$; hence this line $h^2$ always indicates on any of the scales on leg C the distance between the centers of studs X and W. Pointer M lies between legs A and C and its wings $h^6$ extend downwardly into slot $a$, so that the line $h^2$ on this pointer passes through the center of stud X and is always perpendicular to slot $a$; hence this line $h^2$ always indicates on any scale on leg A the distance between point Z and the center of stud X. The line $h^2$ on pointer M also indicates the angle between legs A and C by means of a protractor scale P on leg C.

A triangle embodying my invention is capable of use for a large number of different purposes by draftsmen, engineers, mathematicians, etc. One purpose for which it may be used is in calculations concerning the sides and angles of triangles. For example, when the lengths of two sides of a right-angled triangle are known, the length of the third side may be read at a glance on a triangle embodying my invention. Thus, if the lengths of the two sides which are perpendicular to each other are known, stud X is moved until pointer M indicates the length of one of the known sides on leg A, and leg C is then swung around stud X until pointer H indicates the length of the other known side on leg B; then pointer K indicates the length of the hypotenuse on the corresponding scale on leg C, and pointer M indicates on the protractor scale P the angle between the hypotenuse and one of the other sides. Similarly, when any two sides of a triangle are known, or when any side and either of the angles other than the right angle are known, the remaining side or sides or the angles may be read directly on the proper scales.

A triangle embodying my invention adapts itself readily to many uses on the drawing board, and for this reason I preferably make the holes G in the studs W and X and the hole Z a shade larger in diameter than the diameter of a drawing pencil, so that by passing a pencil through any one of these holes a point may be made on the paper at the center of the stud or at the center of hole Z. Or, if desired, a special instrument of the proper diameter and provided with a sharp point may be employed with advantage instead of a pencil. Then, knowing the length of two sides of a desired triangle, the studs W and X may be so placed that these lengths are indicated by the pointers, and points may then be made on the paper at the center of hole Z and at the centers of the studs, so that the triangle may be drawn without any calculation whatever.

Numerous other uses of the device will readily suggest themselves to those skilled in drafting, trigonometry, engineering, etc., and it is unnecessary for me to give further examples herein.

Although I have herein shown and described only one form of triangle embodying my invention, it is understood that various changes and modifications may be made therein, within the scope of the appended claims, without departing from the spirit and scope of my invention.

Having thus described my invention, what I claim is:

1. A triangle comprising three legs, pivotal members connecting one of said legs with the other two legs, said legs having slots for permitting said pivotal members to slide with relation to the legs, said legs having scales for measuring the lengths of the legs as determined by the positions of the pivotal members, and pointers slidable in said slots and moved by said pivotal members for indicating on said scales the positions of the pivotal members.

2. A triangle comprising three legs one of which is movable with relation to the other two, the movable leg and one of the other legs each being provided with a slot, a stud passing through said slots, one of the slotted legs being provided with a scale, a pointer for reading on said scale, said pointer having a hole through which the stud passes, said pointer also having wings which project into the slot in the leg having the said scale to prevent the pointer from turning with relation to the leg having the said scale.

3. A triangle comprising three legs one of which is movable with relation to the other two, the movable leg and one of the other legs each being provided with a slot, a stud passing through said slots, each of said slotted legs being provided with a scale, and a pointer for each leg for reading on the scale on the corresponding leg, each pointer having a hole through which said stud passes, and each pointer also having wings which project into the slot of the corresponding leg to prevent the pointer from turning with relation to the said corresponding leg.

4. A triangle comprising three legs one of which is movable with relation to the other two, the movable leg and one of the other legs being provided respectively with a hole and a slot, a stud passing through said hole and slot, the slotted leg being provided with a scale, and a pointer for reading on said scale, said pointer having a hole through which the said stud passes and said pointer also having wings which project into said slot to prevent the pointer from turning with relation to the slotted leg.

In testimony whereof I affix my signature in presence of two witnesses.

EDWIN A. DEMMRICH.

Witnesses:
 CHARLES C. WESLEY,
 BESSE M. KLEIN.